United States Patent [19]

Lukas

[11] Patent Number: 5,676,524

[45] Date of Patent: Oct. 14, 1997

[54] VERTICAL-AXIS WIND TURBINE

[76] Inventor: Peter Lukas, Grüngasse 13/15, A-1050 Vienna, Austria

[21] Appl. No.: 612,769

[22] Filed: Mar. 7, 1996

[30] Foreign Application Priority Data

Mar. 8, 1995 [AT] Austria ............................ 404/95

[51] Int. Cl.⁶ ............................................ F03B 7/00
[52] U.S. Cl. ........................ 416/17; 416/24; 416/111; 416/119
[58] Field of Search ..................... 415/17, 24, 108, 415/112, 119, 111

[56] References Cited

U.S. PATENT DOCUMENTS

| | | | |
|---|---|---|---|
| 1,518,022 | 12/1924 | Twiford | 416/17 |
| 4,383,801 | 5/1983 | Pryor | 416/17 |
| 4,424,002 | 1/1984 | Nishiyama | 416/111 |
| 4,441,858 | 4/1984 | Lew | 416/24 |
| 4,507,049 | 3/1985 | Strandgren | 416/119 |
| 4,609,827 | 9/1986 | Nepple | 416/111 |
| 4,764,090 | 8/1988 | Denson . | |

FOREIGN PATENT DOCUMENTS

| | | |
|---|---|---|
| 382687 | 3/1987 | Austria . |
| 2826180 | 12/1979 | Germany . |
| 371803 | 5/1932 | United Kingdom . |
| 2017230 | 10/1979 | United Kingdom . |
| 2244099 | 11/1991 | United Kingdom . |

*Primary Examiner*—John T. Kwon
*Attorney, Agent, or Firm*—Herbert Dubno Andrew Wilford

[57] ABSTRACT

A turbine has an upright shaft defining and rotatable about a vertical main axis, a support plate fixed to the shaft, a plurality of upright vanes pivotal on the support plate about respective vane axes offset from and generally parallel to the main axis, and a control plate rotatable adjacent the support plate about a vertical control axis. The control plate can be displaced relative to the support plate in an adjustment direction perpendicular to the axes. Respective formations on the vanes form grooves extending radially of the respective vane axes and open toward the control plate and respective link pins on the control plate are engaged in the grooves. Respective ring gears are provided on the control and main plates, centered on the respective axes, of the same diameter, and directed toward each other. A pair of respective elongated coupling gears rotatable about parallel horizontal axes extending radially of the main axes and parallel to the adjustment direction are journaled on the shaft and mesh with each other. One of the gears meshes with the control-plate ring gear and the other gear meshes with the support-plate ring gear.

7 Claims, 3 Drawing Sheets

VERTICAL-AXIS WIND TURBINE

FIELD OF THE INVENTION

The present invention relates to a wind turbine. More particularly this invention concerns a vertical-axis turbine with adjustable pitch.

BACKGROUND OF THE INVENTION

A vertical-axis wind turbine is described in U.S. Pat. No. 4,383,801 of Pryor. This device has an upright shaft defining and rotatable about a vertical main axis, a pair of vertically spaced support plates fixed to the shaft, a plurality of upright vanes pivotal between the support plates about respective vane axes offset from and generally parallel to the main axis, and a control plate rotatable adjacent one of the support plates about a vertical control axis. Respective formations on the vanes form grooves extending radially of the respective vane axes and open toward the control plate and respective pins on the control plate engage in the grooves.

A directing vane is attached to the shaft and support plates to keep the device pointed into the wind with a plane defined by the main and control axes parallel to the wind direction. Means is provided for synchronous rotation of the two plates and the link pins are positioned such that on each revolution of the entire assembly the vanes are tipped one way and then the other. Thus on the upwind side of the turbine the vanes are tipped in one direction, on the downwind side they are oppositely tipped, and at the midpoints they extend perfectly parallel to the wind direction so that the turbine is constrained for rotation in one direction.

Since most generators have a nominal operating speed at which they are most efficient, the pitch, that is the angle the vanes form with respect to the wind direction, is typically adjusted to produce this speed, by increasing pitch with low wind speed and decreasing it at high speed. This is achieved by shifting the control-plate axis relative to the main-plate axis, normally with an increase in spacing corresponding to a decrease in pitch and vice versa.

The problem is that it is essential to solidly interconnect the control and support plates for perfectly synchronous rotation. This can be done as described in the above-mentioned Pryor patent by providing pins on one of the plates that fit in large holes in the other plate, but such a system is extremely wear prone and does not insure accurate relative positioning of the plates. Other system described, for example, in U.S. Pat. No. 4,507,049 and Austrian patent 382,687 propose other linkages, but none provides positive truly synchronous coupling via a mechanism that has a long service life.

Another difficulty with the known systems is that it is fairly difficult to take the turbine completely out of service by aligning all its vanes parallel to each other, so that the wind blows through without turning it. To do this it is necessary to provide an inordinate and largely uselessly long travel of the control plate relative to the support plates, traversing a low-pitch adjustment range that is never used in practice on the way to the 0°-pitch setting.

OBJECTS OF THE INVENTION

It is therefore an object of the present invention to provide an improved vertical-axis wind turbine.

Another object is the provision of such an improved vertical-axis wind turbine which overcomes the above-given disadvantages, that is which is of simple construction, but which has positive coupling between the control and support plates.

A further object is to provide an improved turbine whose vanes can easily be set all parallel to each other for use when the device is out of service, as in a hurricane.

SUMMARY OF THE INVENTION

A turbine has according to the invention an upright shaft defining and rotatable about a vertical main axis, a support plate fixed to the shaft, a plurality of upright vanes pivotal on the support plate about respective vane axes offset from and generally parallel to the main axis, and a control plate rotatable adjacent the support plate about a vertical control axis. The control plate can be displaced relative to the support plate in an adjustment direction perpendicular to the axes. Respective formations on the vanes form grooves extending radially of the respective vane axes and open toward the control plate and respective link pins on the control plate are engaged in the grooves. According to the invention respective ring gears are provided on the control and main plates, centered on the respective axes, of the same diameter, and directed toward each other. Respective elongated coupling gears rotatable about parallel horizontal axes extending radially of the main axes and parallel to the adjustment direction are journaled on the shaft and mesh with each other. One of the gears meshes with the control-plate ring gear and the other gear meshes with the support-plate ring gear.

Thus the spacing between the main and control axes can be adjusted on the fly, that is while the system is operating, and this adjustment can be stepless and continuous, for instance effected by a control system having a tachometer connected to the shaft to increase the vane pitch when shaft speed drops below a predetermined threshold and decreasing the pitch when the shaft speed exceeds a higher predetermined threshold. Since the gears are all in continuous mesh, synchronism is perfect and takes place with no significant losses, noise, or vibration.

According to the invention a screw extending in the adjustment direction is anchored to the main shaft and threadedly engages the control plate. A second such support plate fixed on the main shaft is vertically spaced from the first-mentioned support plate. The vanes are between the first and second support plates. The control plate can be below the lower plate, which is the usual configuration, or above the upper plate. The control plate is movable through a predetermined radial stroke relative to the main axis and the ring gears have radii of a length greater than the stroke.

In order to allow the turbine to be set at 0° pitch, each groove has a main section of a predetermined relatively narrow width and an enlarged end section remote from the respective vane axis of substantially greater width. The link pins each have a diameter equal generally to the narrow groove width. Thus if the control plate can be shifted to a minimum-pitch position, but if shifted further the link pins slip out of the groove and into the enlarged end section, allowing the vanes to move perfectly parallel to the wind. Thus the end of the stroke through low-angle pitch settings that would not be used in practice is eliminated, shortening the adjustment stroke without losing anything that could be used. To prevent vibration in the zero-pitch setting each pin carries an eccentric of a length equal generally to the substantially greater width of the end sections. The link pins or these eccentrics are freely rotatable about the link-pin axes.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
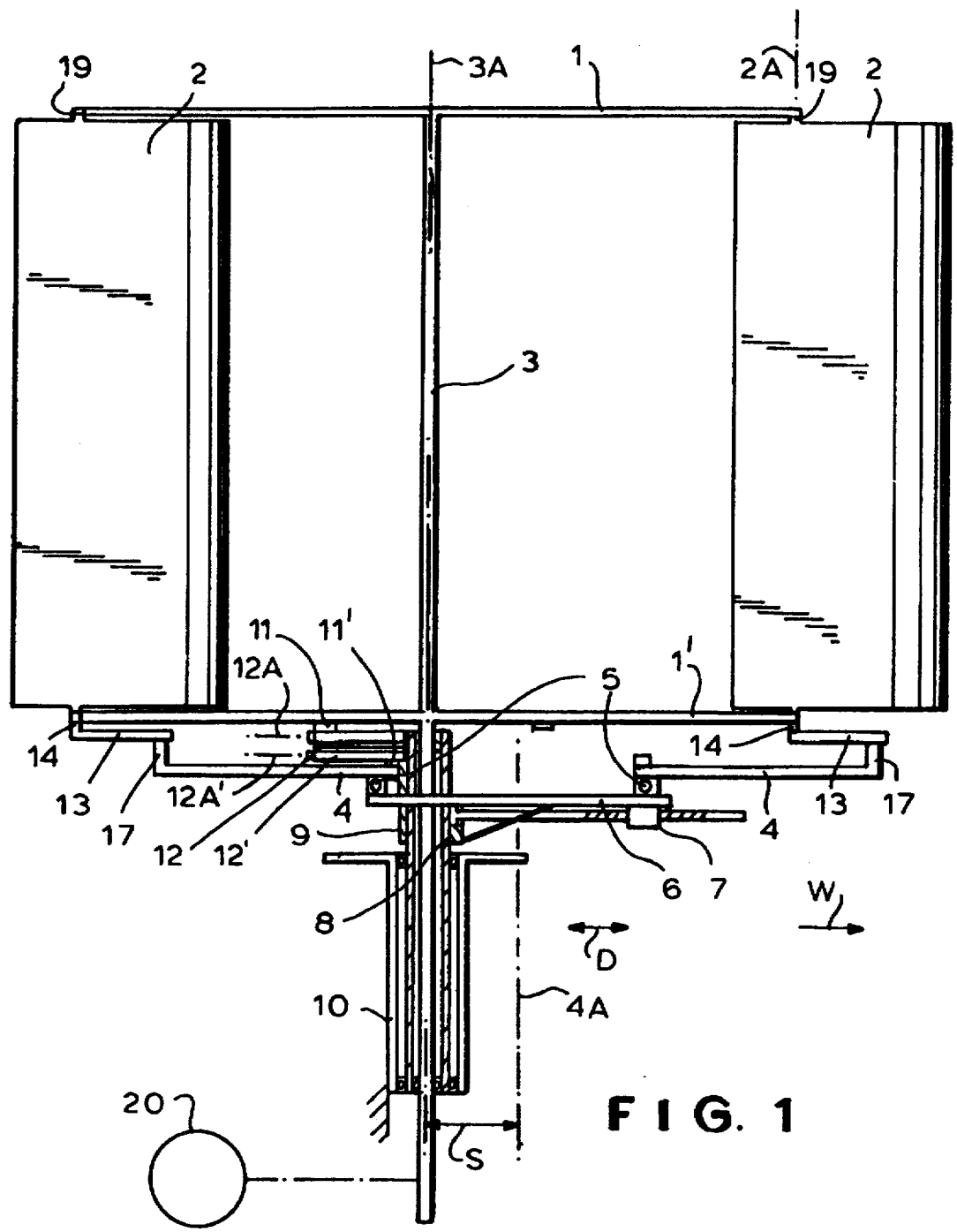
FIG. 1 is a partly diagrammatic and partly sectional side view of a turbine according to the invention.

As seen in FIG. 1 a turbine according to this invention has horizontally oriented, vertically spaced, and parallel top and bottom disks or plates 1" fixed on a vertical axle 3 defining a main vertical axis 3A. Eight generally planar vanes 2 each have vertically outwardly projecting pivot pins 14 and 19 that are coaxial and journaled in the lower plate 1' and upper plate 1 about respective axes 2A parallel to the axis 3A. The shaft 3 is supported by bearings in a coaxial tube shaft 9 itself supported by bearings in a fixed outer support tube 10, all centered on the axis 3A.

An annular control plate or disk 4 centered on an axis 4A parallel to the axis 3A is supported by a bearing 5 on a slide plate 6 that can be moved in an adjustment direction D radially of the axis 3A by means of a screw adjuster 7 seated in an anchor 9 on the shaft 3. When the screw 7 is rotated in one direction a spacing S between the axes 3A and 4A decreases and when oppositely rotated, either manually or by a motor, this spacing S increases.

According to the invention the plates 1' and 4 are provided centered on the respective axes 3A and 4A with identical downwardly and upwardly directed ring gears 11 and 11' of the same diameter and of a radius that is greater than the maximum radial adjustment stroke of the plate 4 relative to the axis 3A. Gears 12 and 12' rotatable about respective parallel horizontal axes 12A and 12A' perpendicular to the axis 3A and have inner ends journaled on the tube shaft 3 and mesh with each other and with the respective ring gears 11 and 11'. Thus regardless of the radial position of the plate 4 relative to the axis 3A, the plate 4 will be constrained to rotate about its axis 4A synchronously with the plates 1 and 1'. In practice a boom 21 (FIG. 2) fixed to and extending radially from the shaft 3 carries a vane 22 which ensures that the plates 1, 1', and 4 are always oriented so that the adjustment direction D is parallel to a wind direction W in which the air surrounding the assembly is moving.

Each of the lower pivot pins 14 projects down through the lower plate 1' and carries just above the plate 4 a radially projecting crank arm 13 extending parallel to the respective vane 2 and formed with a longitudinal slot 15 having an enlarged outer end or bore 16 of a diameter equal to twice a transverse width w (FIG. 3) of the slot 15. The plate 4 carries eight angularly equispaced link pins 17 of a diameter equal to the groove width w and offset angularly on a plane extending in the direction D and including the axes 3A and 4A from the respective pins 14 by a distance equal to half this width w. These pins 17, which are freely rotatable on the periphery of the disk 4 about their axes, carry at their ends in the grooves 15 respective eccentrics 18 that are of an overall length equal to the diameter d of the enlarged end sections 16 but of a width equal to the pin diameter and groove width w.

Figure 2:
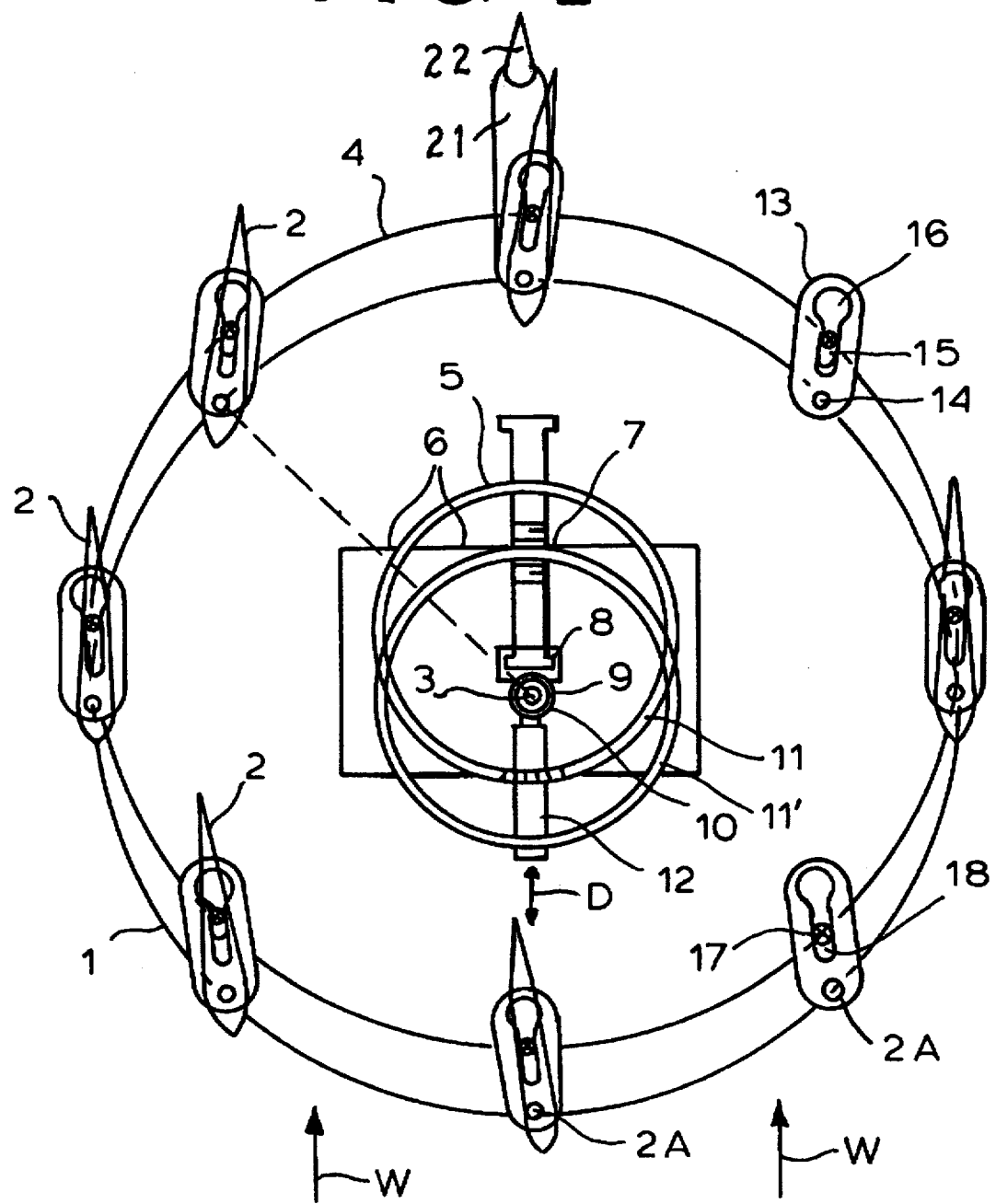
FIG. 2 is a diagrammatic top view of the apparatus in the normal-operation position.
Figure 3:
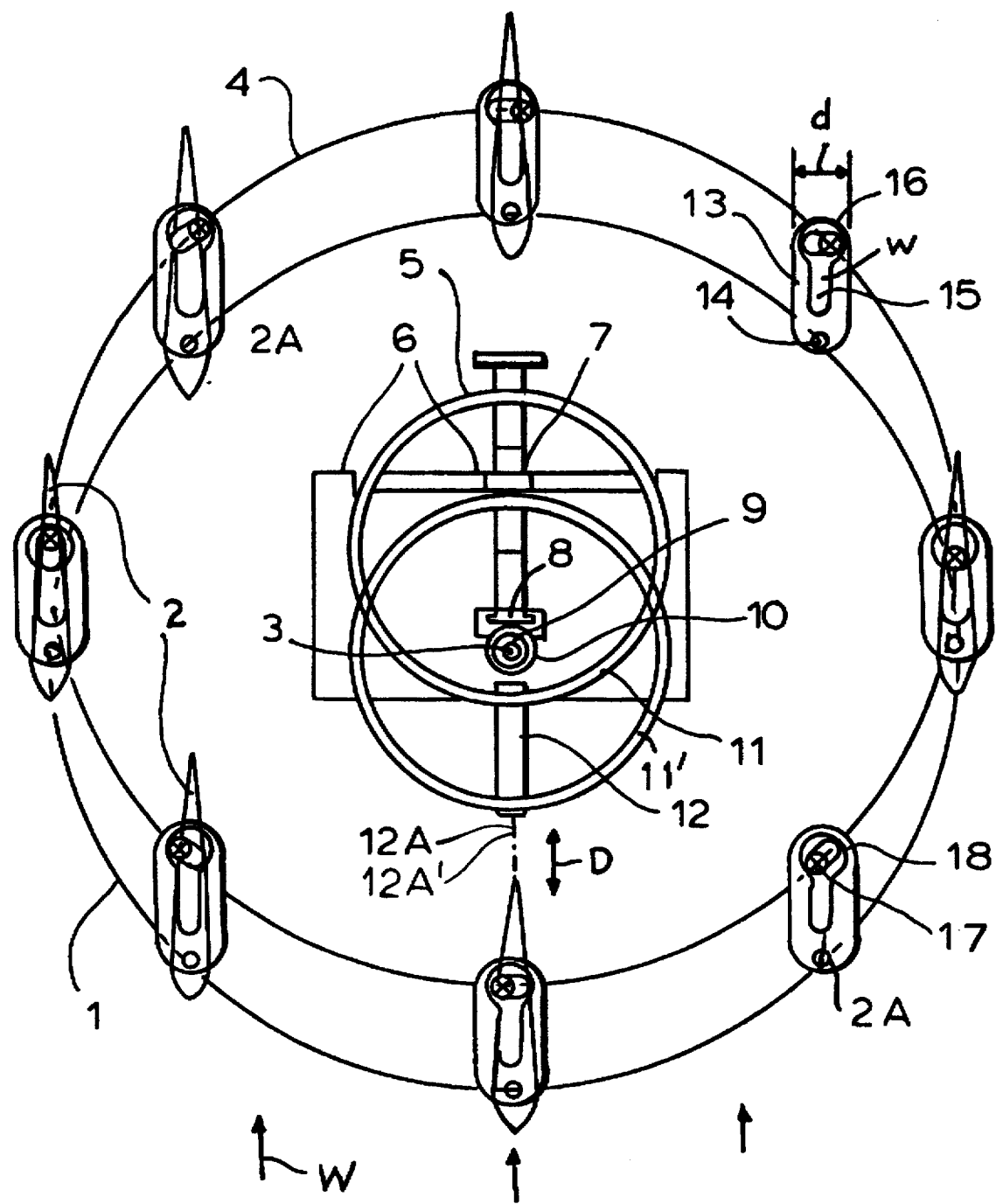
FIG. 3 is a view like FIG. 2 but in the high-wind position.

During normal operation the aligning vane 22, which is substantially larger than the vanes 2, sets the turbine so that the adjustment direction D is aligned parallel to the wind direction D. The pins 14 are engaged in the grooves 15, not in the enlarged end sections 16, and as shown in FIG. 2 the vanes 2 on the downwind or leeward (up in FIGS. 2 and 3) side of the unit are canted in one direction, those on the upwind or weather (down in FIGS. 2 and 3) side of the unit are canted in the opposite direction, and the vanes 2 on the sides are pointed perfectly in the direction W. As shown in the drawing this will cause the wind to exert as shown in FIGS. 2 and 3 a counterclockwise torque on the turbine, pushing the downwind vanes to the left and the upwind vanes to the right. The adjuster 7 determines the extent of canting or pitch of the vanes 2, increasing it as it decreases the spacing S between the axes 3A and 4A and decreasing it as it increases this spacing. Thus at low wind speeds the spacing S is maximized to maximize the vane pitch, and as the wind speed increases the spacing is increased to decrease the vane pitch.

If the turbine is to be taken out of service, for instance in a hurricane, the spacing S between the axes 3A and 4A is maximized by the adjusters to put the pins 14 in the centers of the enlarged circular-section end sections 16 of the cranks 13. As a result as shown in FIG. 3 the vanes 2 are all able to align themselves exactly parallel to the wind direction W so that the assembly will not turn at all.

I claim:

1. A turbine comprising:
   an upright shaft defining and rotatable about a vertical main axis;
   a first support plate fixed to the shaft;
   a plurality of upright vanes pivotal on the support plate about respective vane axes offset from and generally parallel to the main axis;
   a control plate rotatable adjacent the support plate about a vertical control axis;
   means for displacing the control plate relative to the support plate in an adjustment direction perpendicular to the axes;
   respective formations on the vanes forming grooves extending radially of the respective vane axes and open toward the control plate;
   respective link pins on the control plate engaged in the grooves;
   respective ring gears on the control and main plates, centered on the respective axes, of the same diameter, and directed toward each other; and
   respective elongated coupling gears rotatable about parallel horizontal axes extending radially of the main axes and parallel to the adjustment direction, journaled on the shaft, and meshing with each other, one of the gears meshing with the control-plate ring gear and the other gear meshing with the support-plate ring gear.

2. The turbine defined in claim 1 wherein the displacing means includes a screw extending in the adjustment direction, anchored to the main shaft, and threadedly engaging the control plate.

3. The turbine defined in claim 1, further comprising
   a second support plate fixed on the main shaft and vertically spaced from the first support plate, the vanes being between the first and second support plates.

4. The turbine defined in claim 1 wherein the control plate is movable through a predetermined radial stroke relative to the main axis and the ring gears have radii of a length greater than the stroke.

5. The turbine defined in claim 1 wherein each of the vanes is provided with a crank formed with the respective groove.

6. The turbine defined in claim 1 wherein each groove has a main section of a predetermined relatively narrow width and an enlarged end section remote from the respective vane axis of substantially greater width, the link pins each having a diameter equal generally to the narrow groove width.

7. The turbine defined in claim 6 wherein each pin carries an eccentric of a length equal generally to the substantially greater width of the end sections.

* * * * *